Sept. 20, 1955　　　A. R. LINTERN　　　2,718,186
FRESH-AIR VEHICLE VENTILATING AND HEATING
SYSTEM AND UNITS THEREFORE
Filed June 25, 1951　　　2 Sheets-Sheet 1
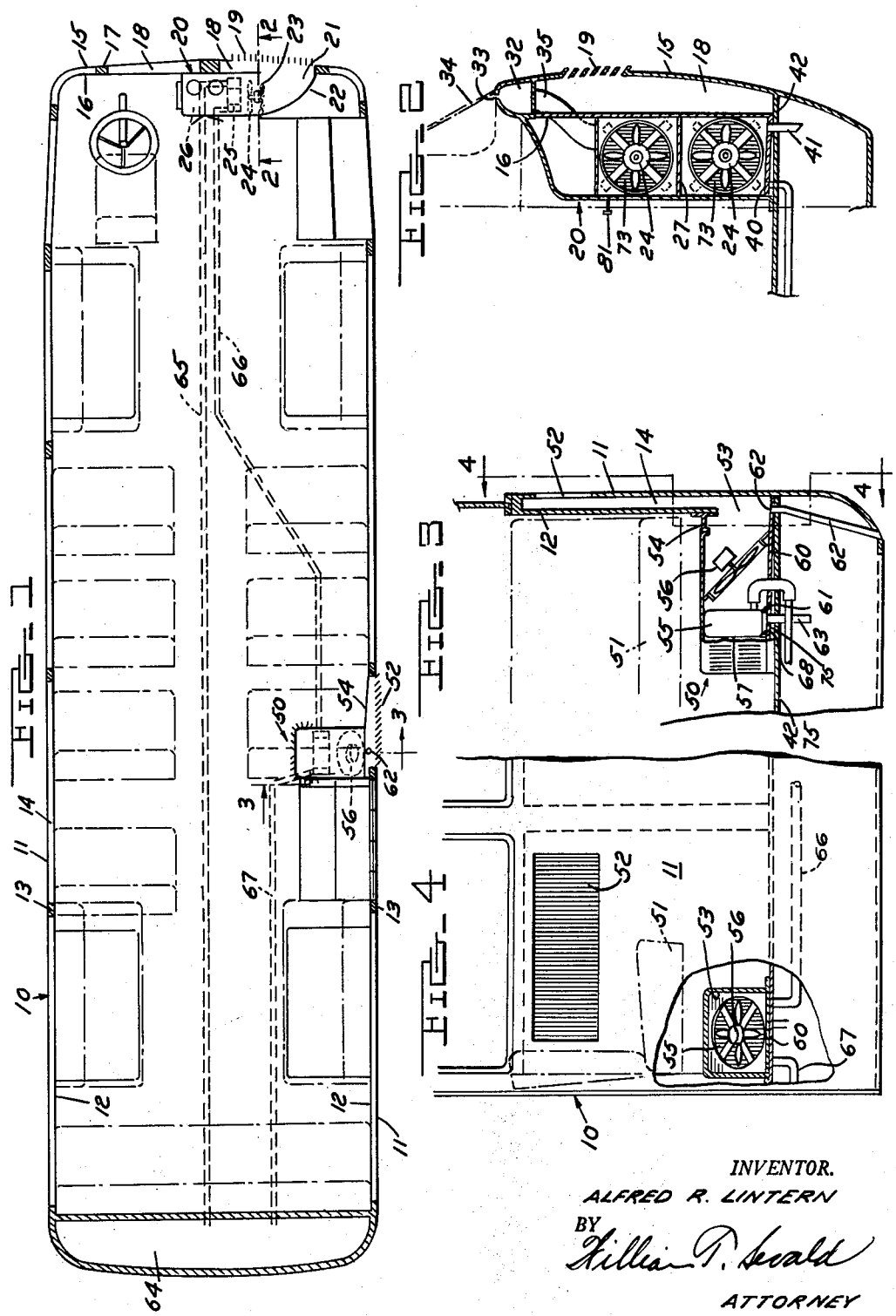
INVENTOR.
ALFRED R. LINTERN
BY
ATTORNEY

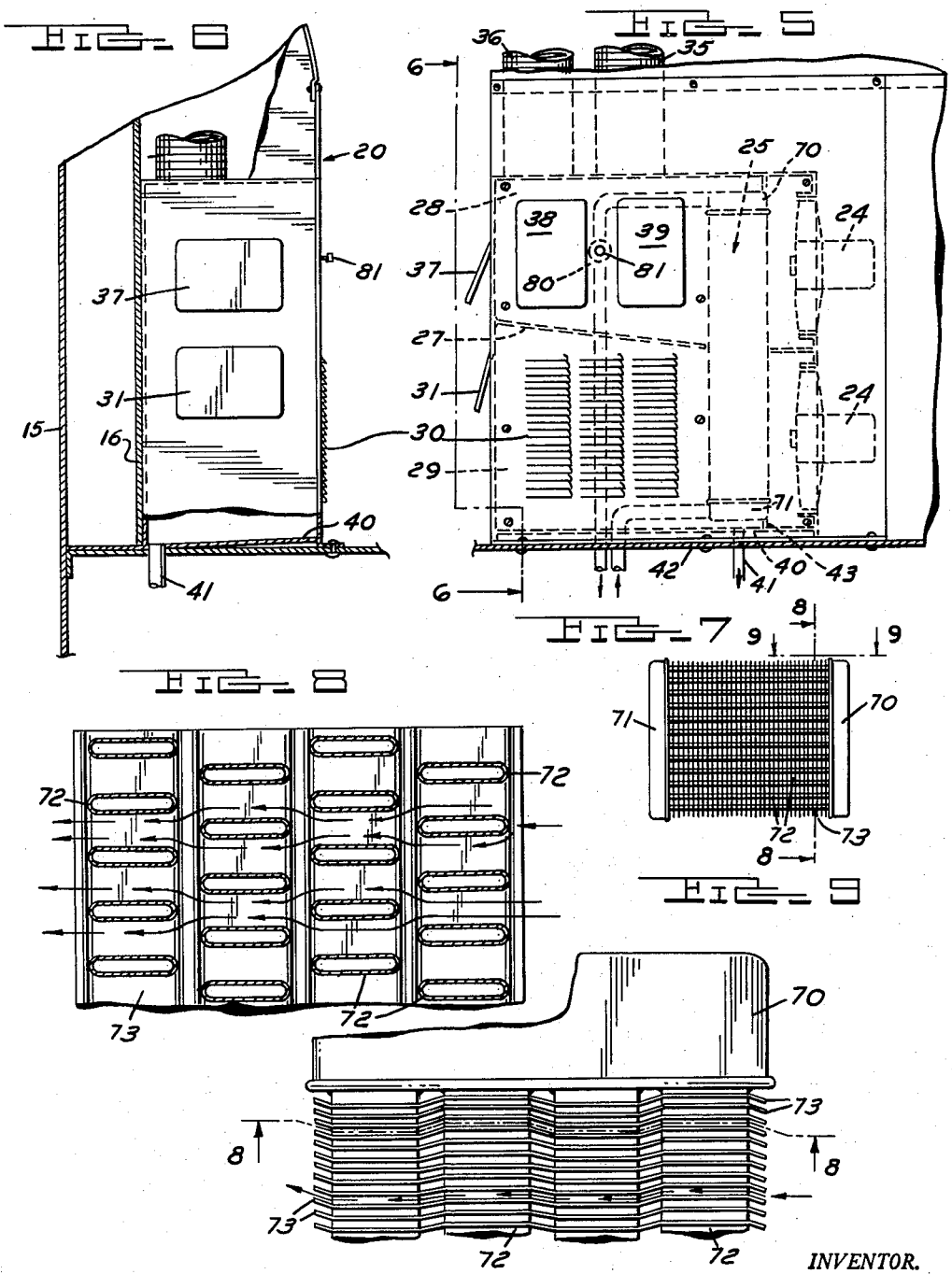

United States Patent Office 2,718,186
Patented Sept. 20, 1955

2,718,186
FRESH-AIR VEHICLE VENTILATING AND HEATING SYSTEM AND UNITS THEREFOR

Alfred R. Lintern, Detroit, Mich., assignor to A. R. Lintern, Inc., a corporation of Michigan Application June 25, 1951, Serial No. 233,307

6 Claims. (Cl. 98—10)

This invention relates to fresh-air, no-draft, vehicular ventilating and heating units and a system not employing distribution ducts particularly suitable for buses which are capable of supplying an exceptionally large volume of fresh air, optionally heated, regardless of heat, cold, heavy rain or snow, or other adverse climatic conditions.

The several devices and systems of the prior art do not supply an adequate supply of fresh air for passenger consumption without supplementary ventilation such as open windows and auxiliary vents as it has been found that from 20 to 30 cubic feet of air per minute per passenger is required to adequately ventilate the bus dependent on outside air purity, toxic content, moisture content, temperature inside and outside the bus, etc. The known means for ventilating and heating are multiple but unsatisfactory primarily due to the fact that they do not supply sufficient air to not only furnish fresh supplies of oxygen but also to furnish a sufficient volume to carry off passenger breath exhaled moisture and skin evaporated moisture to prevent the air from becoming heavily oppressive resulting in nausea.

The known fresh-air ventilating and heating means have been concentrated on heating to the practical exclusion of ventilating with the result that the passengers are warm but "sick" or resisting the sensation of "sickness" or nausea.

Prior art ventilating systems have employed duct-work to introduce and distribute fresh-air in the bus interior and fabricated vents to pass air out of the bus. The ducts have been positioned above the floor, into side walls and in the ceiling of the bus so that airborne rain and especially snow is introduced into the duct work along with the air and leaks outwardly from the duct-work into the bus interior necessitating that the system be shut-off when most needed as the windows of a bus cannot be opened during a rain or snow storm. The fresh air ventilating system is most needed in heavy, oppressive atmospheric conditions, such as during a rain or snow storm. Obviously heat is required in weather conducive to snow. In some of the prior art instances the heating system has been separated from the ventilating system resulting in hot and cold drafts and air channeling between the ducts and the vents to the isolation of some areas of the bus.

The instant invention makes full use of two characteristics of the modern bus. First that the engine has a heat-loss sufficient to heat a tremendous volume of air which is dissipated to keep the engine cool. Second that the bus body is a homogeneous, overall porous shell of small leaks which becomes more porous with use, which porosity ordinarily permits uncontrolled intake and outlet channeling of air in the body interior. The inventive system, instead of dissipating the engine heat-loss via the engine radiator, uses same to optionally heat a tremendous volume of fresh air; and instead of trying to eliminate the body porosity, the instant invention utilizes same as outlets for air so that the body interior becomes pressurized and bleeds outwardly only through the body pores. As an illustration of bus body porosity under pressure, it is well known that a bus will not float in water even momentarily in spite of sufficient displacement to float the mass. The water comes in immediately due to the pressure and body porosity. In the instant invention the air bleeds out as easily as the water would come in due to pressure and body porosity.

Due to the equalized fluid pressure on the interior of the body and due to the practically homogeneous overall body porosity, air flow in the bus is not perceptible to the passengers and no drafts occur due to the jet effect of the pores being external of the body.

The instant invention employs no distribution ducts but rather, preferably a large front ventilating and heating unit and one, or more, smaller side units preferably midway in the bus. It is important to note that the units project their outlets into the longitudinal central area of the bus body so that the air bleeds from this area to the perforate sides, ends, and top of the body and outwardly therethrough. Novel snow and rain scrubbing cores are employed in the units with novel air and water discharging drains permitting full use of the units and systems under any climatic conditions without clogging or dripping into the bus interior. The simplicity of the units and system makes for inexpensive installation in a completely fabricated bus or integration in the construction of a bus.

It is, therefore, the primary object of the invention to provide a bus heating system which supplies a very large volume of fresh air optionally heated to pressurize a bus interior from which interior the air bleeds outwardly through the porous body to eliminate drafts and to carry off the large volume of air saturated with moisture emitted from the passengers.

An object of the invention is to provide a system and units which is equally usable in summer or winter, and equally usable when it is raining or snowing.

An object of the invention is to provide a system of ventilating and optionally heating a bus wherein the units discharge a very large volume of fresh-air into the longitudinal central area of the bus away from the porous walls of the body so that the pressurized interior bleeds homogeneously outwardly of the bus through the porous walls with the introduced air moving from the longitudinal central area of the bus toward the wall ends, and ceiling thereby substantially eliminating air currents, drafts, and accidental intake.

An object of the invention is to locate the units so that the air directed therefrom will be projected into the longitudinal central area of the bus body so that the furnished fresh air will flow from the central longitudinal area of the bus body toward the side walls as the air adjacent the side walls moves to the outside of the body via the cracks, fissures and openings therein.

An object of the invention is to provide a fresh air ventilating and heating system which does not employ distribution duct-work.

An object of the invention is to provide scrubbers in the core-area of the heater so that all snow and rain will be scrubbed out of the incoming fresh air before it is projected into the interior of the bus.

An object of the invention is to provide drain-pans in a heated air channel and drains therefrom through which scrubbed out water and heated air are transmitted to prevent freezing of water in the drains in cold weather.

An object of the invention is to provide a system using units capable of also defrosting the windshield of the bus using main heater blowers thereby eliminating special defroster blowers.

An object of the invention is to provide a system using units which are easily manufactured, installed, repaired, or altered at low cost.

An object of the invention is to provide a system using units which are readily and simply controlled.

An object of the invention is to provide one large unit utilizing two motors in the front of the bus and one or more smaller under-seat units using one motor located rearwardly of the front unit.

These and other objects of the invention will become apparent by reference to the following description of a bus fresh air ventilating and heating system embodying the invention taken in connection with the accompanying drawings in which:

Fig. 1 is a plan view of a bus incorporating the inventive heating and ventilating system.

Fig. 2 is a cross-sectional view of Fig. 1 taken on line 2—2 thereof showing the front of the bus and the large unit adjacent thereto.

Fig. 3 is a cross-sectional view of Fig. 1 taken on the line 3—3 thereof showing the side of a bus and the smaller unit adjacent thereto.

Fig. 4 is a fragmentary side elevational view taken on the line 4—4 of Fig. 3 of a bus body in the area of the side unit partly broken away to show the unit structure.

Fig. 5 is a side elevational view, partly in cross-section of the large ventilator and heater shown in the front of the bus in Fig. 1.

Fig. 6 is an end elevational view of the unit shown in Fig. 5.

Fig. 7 is an elevational view of the heater core.

Fig. 8 is a cross-sectional view of Fig. 7 taken on line 8—8 thereof and of Fig. 9 taken on line 8—8 thereof; and Fig. 9 is a cross-sectional view of Fig. 7 taken on line 9—9 thereof.

Referring now to the drawing wherein like numerals refer to like and corresponding parts throughout the several views, the bus ventilating and heating system and units disclosed therein to illustrate the invention comprises a large blower and heater unit adjacent the front inside wall of the bus designed to condition the fresh air that is taken in through the front openings and to discharge the air within the bus, and a smaller underseat blower and heater unit located mid-way in the bus preferably ahead of the bus rear doorway and stepwell area designed to condition the fresh air that is taken in through the side openings and to discharge the air within the bus supplementing the conditioned air provided by the large blower and heater unit to obtain a substantially uniform temperature throughout the bus under all weather conditions.

More particularly, the invention in its illustrated environment comprises a bus 10, an outside side-wall 11, an inside side-wall 12, body posts 13 disposed between the walls 11 and 12 creating air chambers or passageways 14 between the walls and posts, an outside front wall 15, an inside front wall 16, posts 17 between the front walls creating an air chamber or passageway 18 between the walls and posts, ram-air intake louvers 19 in the front outside wall 15 communicating with the passageway or chamber 18 so as to deliver air thereto, a large ventilating and heating unit 20 positioned adjacent the central portion of the inside front-wall 16, a large opening 21 in the inside side-wall 16 for delivering air from the passageway or chamber 18 into the interior of the bus, a hinged cowl 22 adapted to cover the opening 21 and to direct the air emitting therefrom to the unit 20, a screen 23 on the intake side of unit 20 adapted to filter out leaves, paper, etc., from the incoming air as it enters the unit 20, fans 24 in the unit 20 for augmenting the air flow, a core 25 for optionally heating the air, a plenum chamber 26 on the delivery side of the core 25, a separator 27 dividing the plenum chamber 26 into upper chamber 28 and lower chamber 29, louvers 30 in the face of the unit 20 for continuously directing air into the central longitudinal area of the bus from the lower chamber 29, a door 31 in the end of the unit facing the driver for optionally delivering air in the area of the driver's feet from the lower plenum chamber 29, a windshield defroster plenum chamber 32, Fig. 2, a windshield co-extensive vent 33 leading from the chamber 32 immediately below the windshield 34 for directing air over the entire area of the windshield, air ducts 35 and 36 leading from the top of the unit 20 communicating with the upper plenum chamber 28 connected to the defroster plenum 32 for delivering air to the defroster system, an upper end door 37 for optionally directing air adjacent to the driver's feet communicating with the upper plenum chamber 28, upper face doors 38 and 39 connecting with the upper plenum chamber 28 for optionally directing air into the longitudinal central area of the bus to supplement the flow of air from the louvers 30, a drain pan 40 below the core 25 for collecting water dropping off the core 25 and a drain 41 in the pan 40 for transmitting water collected in the pan 40 to the outside of the bus below the floor 42 of the bus, a spacer, baffle, or flange 43 on the pan 40 preventing the entrance of air from the intake side of the core 25 to the area of the pan 40 and permitting air on the exhaust side of the core 25 to enter the pan 40 and drain 41 area as hereinafter more fully described.

The rear underseat unit 50 is positioned below a seat 51 adjacent the inside wall 12 and receives air from the air-scooping louvers 52 in the outside wall 11 via the chamber 14 between the walls 11 and 12 through the opening 53 in the inside wall 12 over which the fresh air intake side or end of the unit 50 is positioned; the opening 53 is longer than the length of the intake side of the unit 50 and the angularly disposed cowl 54 furnishes an expanding chamber directing air at its larger end into the intake side of the unit 50. The unit 50 comprises a core 55 adjacent the fresh air outlet end thereof, a fan 56 on the intake side of the core 55 and a plenum chamber 57 on the exhaust side of the core 55 for directing air from the plenum chamber 57 via the louvers 52 into the longitudinal central area of the bus, a drain pan 60 below the core 55, a baffle 61 sealing the bottom of the core 55 in communicating relationship to the pan 60, a drain 63 in the pan 60 for transmitting water collecting in the pan 60 on the exhaust side of the core 55 and a drain 62 on the intake side of the core 55 to the outside of the bus below the floor 42 as hereinafter more fully described. The baffle 68, Fig. 3, when used, seals off the bottom air and water discharging end 75 of the core 55 in communication with the drain 63.

The cores 25 and 55 are supplied with a heating medium from the bus engine in the compartment 64 via the conduit 65 leading to the intake side of the core 25 in the unit 20, via the conduit 66 leading from the outlet side of the core 25 to the intake side of the core 55, and via the conduit 67 leading from the outlet side of the core 55 to the vehicle engine.

The core 25 comprises headers or end-cans 70 and 71, banks of staggered vertically disposed tubes or conduits 72 transmitting heating medium between the headers 70 and 71 and horizontally disposed corrugated or waved fins 73 solidly contacting the tubes 72 so that air passing through the core 25 follows a sinuous and baffled path through the core as illustrated by the arrowed lines of Fig. 8 and follows a baffled sinuous path as indicated by the arrowed lines of Fig. 9 so that the air curves up and down and curves from side to side as it passes through the core with the air being churned, divided, converged, and re-divided so that all rain or snow in the air is scrubbed out of the air as it passes through the core. Rain and/or snow in the air picked up by the tubes 72 and fins 73 is transmitted downwardly to the bottom of the core from which it drops into the drain pan 40 from where it is emitted via the drain 41. The core 55 has the same components as the core 25 and acts on the air in the same way except that the tubes are horizontal and the fins are vertical. The core 55 emits or exhausts air at the bottom 75, Fig. 3, of the core 55 and the drag of the air on the water particles adhering to the fins and tubes at the bottom of the cores drives the water into the drain pan, and, in the instance of underseat unit 50 and the front unit 20, it will be noted that the baffles 61 and 43 respectively confine the air emitting from the bottom 75 of the core 55 in the area of the pan so that heated air is transmitted to the outside of the bus via the drains 63 and 41 which air, having been heated, prevents the freezing of water in the drains thereby preventing the drains from becoming clogged through the formation of ice. In the instance of the unit 50, Fig. 3, the baffle 61 seals the drain pan 60 and the drain 63 on the exhaust side of the core 55 and on the exhaust side of the bottom 75 so that heated air is transmitted through the drain 41 from both the back and bottom of the unit to prevent the water traveling therethrough from freezing and clogging the drain.

A water control valve 80, Fig. 5, of the type which completely cuts off flow or permits full or variable flow of heating medium is positioned in the heating medium conduits or a core member and the operating knob 81 of the valve 80 extends outwardly of the face of the unit 20 conveniently adjacent the driver. No rheostats or air flow controls are necessary as the full fresh air supply is required all the time and is heated to the desired degree by the adjustment of the valve 80.

The units and system have been thoroughly tested such as at zero outside temperature, at a bus speed of 30 miles per hour, with the water heating medium temperature at 170 degrees F. With all fresh-air intake and no recirculated heated air it was found that the bus average inside temperature was 60 degrees F. with an average deviation of plus or minus 6° F. with no drafts. Summer tests have been equally successful.

Although but a single embodiment of the invention has been shown and described in detail, it is obvious that many changes may be made in the size, shape, detail, and arrangements of the elements of the invention, such as providing thicker core members in cold climates, within the scope of the appended claims.

I claim:

1. A vehicle ventilating and heating system comprising a fresh-air intake in the vehicle, a heater and blower unit adjacent said intake, means directing the air from said intake to said unit, a screen disposed in said means permitting the passage of air, rain and snow but capable of stopping the passage of debris, a heater core including headers in said unit, staggered banks of horizontal tubes communicating between said headers for dividing, converging, and redividing the air as it passes through said core so as to scrub out rain and snow from the air passing therethrough, closely positioned waved fins disposed on said tubes between said headers causing the air passing therethrough to follow a sinuous path so as to scrub out rain and snow from the air passing therethrough; said tubes being capable of transferring water collected thereon to said fins and said fins being capable of transferring water collected thereon and water received from said tubes downwardly to the bottom of said fins, a drain pan below said core for catching the water dropping from said fins, a drain for conducting the water from said pan to the exterior of the vehicle, means sealing off the fresh air intake side of said core from said pan area so that said pan and drain are in communication with the air exhaust side of said core in the area heated by said core to prevent the freezing of water in said pan.

2. A fresh-air vehicle ventilating and heating unit comprising air-scooping louvers in the vehicle adapted to deliver fresh-air to the vehicle interior, a cowl cooperating with the vehicle body structure channeling delivered air directly into the unit, a core member in the unit having staggered banks of horizontal heating medium conducting tubes adapted to divide, converge, and redivide the air passing therethrough thereby churning and scrubbing the air passing therethrough relative to the horizontal, closely positioned corrugated vertical fins mounted on said tubes adapted to scrub the air passing through said core by forcing same to travel a sinuous, baffled path relative to the vertical; said core thereby scrubbing out air carried moisture such as rain and snow as it passes therethrough with said core being capable of melting snow to change same to water; said tubes transferring moisture collected thereon to said fins and said fins transmitting moisture collected thereon and moisture from said tubes downwardly to the bottom of said core, means at the air intake face of said core isolating same from the air discharge bottom end of said core so that the air passing through said core escapes via the bottom end of said core so as to drag the moisture collected at the bottom of said core off said core downwardly, a pan below the bottom end of said core for collecting the moisture dropping from said core, a drain in said pan for transmitting moisture collected therein to the vehicle exterior and also for transmitting heated air discharged from said core to the vehicle exterior to prevent water freezing in said drain.

3. In a unit as set forth in claim 2, a baffle confining the air discharged from the bottom end of said core so as to channel all air discharged therefrom in forced communication with said drain.

4. A vehicle fresh-air ventilating and heating unit comprising a fresh air intake communicating with a heat exchange core having heating means therein, said core being adapted to scrub out all rain and snow and to melt all snow borne by air travelling therethrough, vertical fins in said unit adapted to transmit scrubbed-out water downwardly to the bottom of said core, baffles sealing off the air intake side of said core, a pan below said core adapted to collect water dropping from the bottom of said core, and a drain in said pan adapted to transmit water from said pan to the outside of the vehicle; said pan and said drain being in communication with the heated air discharge side and bottom end of said core so that heated air is transmitted via said drain to the outside of the vehicle to prevent ice forming in said drain.

5. In a device as set forth in claim 4, a second baffle confining the air discharged from the bottom end of said core relative to said pan and drain so that all air emitting from the bottom end of said core is discharged through said drain.

6. A fresh air ventilating and heating unit especially suitable for location in a bus body including ram air inlet louvers, said unit being disposed over ram air inlet louvers in said bus body, a cowl connecting said unit and said bus body for channeling incoming air into said unit, a heater core disposed in said unit through which said incoming air passes, is heated, and discharged, a plenum chamber on said unit at the discharge side of said core, means for venting the air from said plenum chamber, a separator in said plenum chamber dividing said chamber into top and bottom chambers, conduits leading from said top chamber to a windshield defroster system, closable louvers in said unit at said top chamber for optionally directing all air therein to said conduits or for optionally venting air therein directly to the bus interior, vents in said bottom chamber for venting air directly into the bus interior, and a closable louver in said bottom chamber for optionally directing a portion of the air from said lower chamber to the driver area.

References Cited in the file of this patent

UNITED STATES PATENTS

| Number | Name | Date |
|---|---|---|
| 1,916,549 | Young | July 4, 1933 |
| 1,955,269 | Anetsberger et al. | Apr. 17, 1934 |
| 2,026,929 | Backe | Jan. 7, 1936 |
| 2,073,744 | Henney | July 20, 1937 |
| 2,153,267 | Morse | Apr. 4, 1939 |
| 2,235,642 | Lintern et al. | Mar. 18, 1941 |
| 2,242,337 | Aufiero | May 20, 1941 |
| 2,304,643 | Hans | Dec. 8, 1942 |
| 2,306,796 | Staley et al. | Dec. 29, 1942 |
| 2,355,151 | Findley | Aug. 8, 1944 |
| 2,355,501 | Arnold | Aug. 8, 1944 |
| 2,360,617 | Onishi et al. | Oct. 17, 1944 |
| 2,476,368 | Guernsey | July 19, 1949 |
| 2,488,278 | Findley | Nov. 15, 1949 |
| 2,526,560 | Hans | Oct. 17, 1950 |
| 2,640,409 | Hans | June 2, 1953 |